X. ROBERT.
HYDROSTATIC BALANCE WITH COUNTER.
APPLICATION FILED DEC. 29, 1917.
1,317,104.
Patented Sept. 23, 1919.
2 SHEETS—SHEET 1.
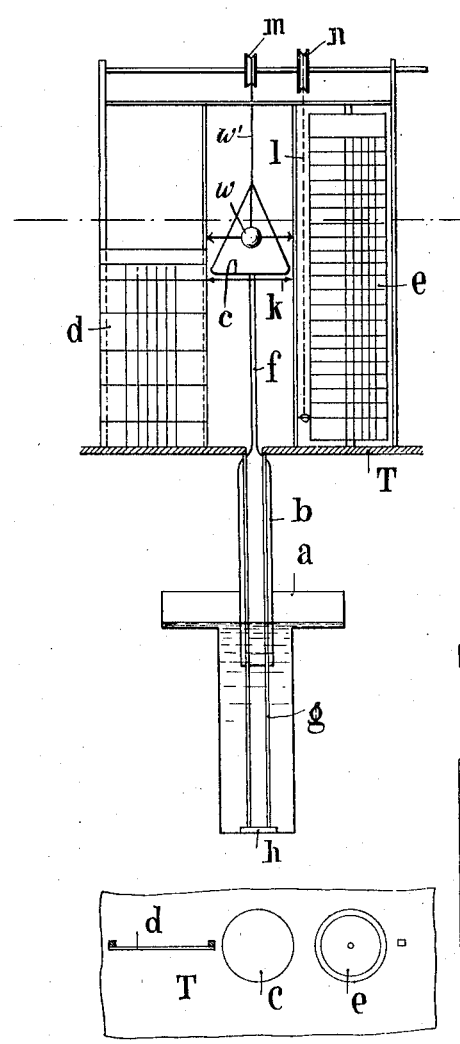
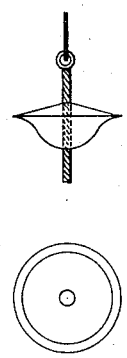
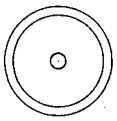
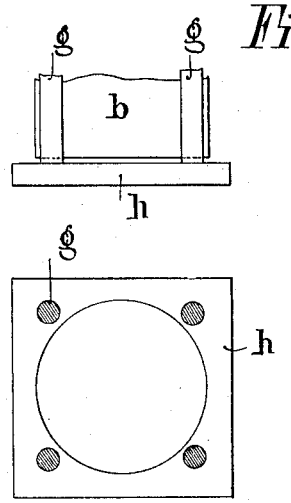

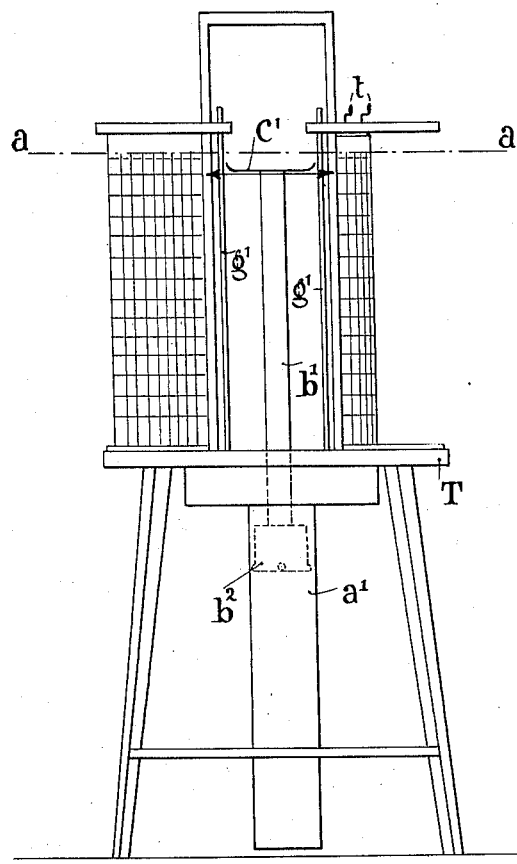
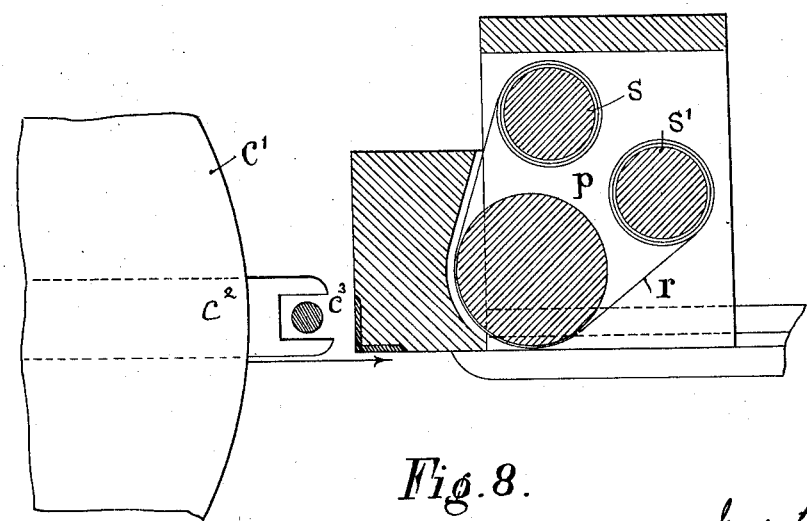

UNITED STATES PATENT OFFICE.

XAVIER ROBERT, OF LA ROCHELLE, FRANCE.

HYDROSTATIC BALANCE WITH COUNTER.

1,317,104. Specification of Letters Patent. Patented Sept. 23, 1919.

Application filed December 29, 1917. Serial No. 209,596.

*To all whom it may concern:*

Be it known that I, XAVIER ROBERT, a citizen of the Republic of France, residing at La Rochelle, France, have invented certain new and useful Improvements in Hydrostatic Balances with Counters, of which the following is a specification.

My invention relates to a hydrostatic balance provided with a counter and having for an object to conveniently inform the public, by indicating through appropriated calculating tables combined with the movements of a scale, the cost of an amount of goods or merchandise weighed at the same moment.

The calculating tables bearing the required information, for instance, the kind of goods, price and weight for the selected unit or any fraction of same, will enable to maintain good relations between the purchaser and seller.

In the accompanying drawings given by way of example and to which reference is made—

Figure 1 is a side elevation.

Fig. 2 is a plan view.

Figs. 3, 4, 5 and 6 are details of construction.

Fig. 7 is a view similar to Fig. 1, but showing a slightly modified form of apparatus, although embodying the same principles.

Fig. 8 is a plan view of the device taken along the lines of Fig. 7.

Referring to Figs. 1 to 6, it will be seen that the present balance comprises a trough filled with water and in which sinks a float $b$ bearing at its upper portion the scale pan $c$ of the balance, by means of a convenient rod. Calculating tables $d$ and $e$ are arranged at opposite sides of the scale pan and respectively indicate the weight and prices of the weighed goods.

The float is formed by a cylindric pipe closed at its base and arranged at the top for receiving a rod $f$ bearing the scale pan $c$. Said float is held and guided vertically by bars $g$.

The calculating tables $d$ and $e$ may be of any suitable construction.

Several tables may be employed on account of the variety of goods. These tables may be arranged on the right or left side of the scale pan of the balance, and fixed on the selling table.

The scale pan $c$ of the balance connected to the float $b$ is provided with indicating pointers $k$ which sweep over the calculating tables and coact therewith to indicate the weight and price of the merchandise in the scale pan.

A calculating table can also be placed above the balance and to coact with a small weight $w$ bearing indicating pointers and suspended from a thread $w'$ working over a pulley $m$ and which is connected to the scale pan $c$. This small weight is raised in accordance with the weights placed on the scale pan. The sections on the tables are ruled by employing the standard small weights which the pointers indicate opposite the lines corresponding to the weights employed. The space between the sections varies according to the diameter of the floats used. In order to increase the space between the sections or ruled lines on the tables and enable greater precision to be attained, a pulley $n$ of a larger diameter, is fixed coaxially with the pulley $m$ and turns therewith. The thread $l$ from which is suspended the small weight unrolls over the large pulley, and by using a pulley $n$ of appropriate diameter the weight may be moved to any desired extent, according to the width of the spaces between the sections. The greater such width, the greater will be the precision of the balance, as will be understood.

When the calculating tables are ruled with the standard weights, the trough must not be changed, nor the float, but in case the water has lowered in the trough, this water must be supplied to the required level to keep the pointers of its scale pan opposite the nought of the calculating table when the said scale pan is empty.

In the modification shown in Figs. 7 and 8, the scale pan $c'$ of the balance is placed directly on the upper end of the float $b'$, without the supporting rod, to reduce the height of the table. The trough $a'$ is disposed just under the plate of the table T, and the float is guided by a centrally arranged bar $c^2$, which is secured below the scale pan and has notches $c^3$ in its ends, and by vertical rods $g'$ placed on the table on opposite sides of the float and scale pan and which engage in said notches.

For reducing the depth of immersion resulting from the weight of the float and the scale, the section of the float at its lower part $b^2$ will be increased and the result will be that much more water will be displaced in reducing the immersion and this will enable the number of sections of the counter to be increased. Before ruling said sections the lower part $b^2$ must be kept immerged.

For facilitating the selling in small quantities the usual counter for merchandise will bear sections for five cents, for instance, indicated by way of red lines, for selling fruits, vegetables, and other merchandise.

Furthermore, a general calculating table $p$ may also be utilized in case that the prices of merchandise change. Said table is located near the scale pan $c'$ and is formed by a hand or strip $r$ bearing the prices, and winding over two rolls $s$ and $s'$ through a convenient crank $t$ for unrolling or rolling the same. This table will be provided with a number of columns inscribed with different prices. To each column indicating the price, will correspond the name of the goods to be vended.

My improved hydrostatic scale will be of great use in the small trade, as the purchaser will know the weight of the bought merchandise and will be able to judge the correctness of said weight and he will also know beforehand the cost for a certain weight of any merchandise.

What I claim is:—

In a hydrostatic weighing scale, a tank, a float therein, a scale pan carried by the float and provided with pointers, a table of weights at one side of the scale pan, and a table of prices at the opposite side thereof, the pointers of the scale pan coacting with the said table to indicate the weights and prices of the goods on the scale pan, pulleys of unequal diameter mounted for rotation above the scale pan, a cord connecting the scale pan to the smaller pulley, a weight arranged to move vertically on one of the tables and having a pointer, and a cord connecting said weight to the larger pulley.

In testimony whereof I have hereunto set my hand in presence of two subscribing witnesses.

XAVIER ROBERT.

Witnesses:
 VICTOR PRÉVOST,
 CHAS. P. PRESSLY.